United States Patent
Merli et al.

(10) Patent No.: US 12,517,345 B2
(45) Date of Patent: Jan. 6, 2026

(54) MEMS MIRROR DEVICE WITH PIEZOELECTRIC ACTUATION AND MANUFACTURING PROCESS THEREOF

(71) Applicant: STMicroelectronics S.r.l., Agrate Brianza (IT)

(72) Inventors: Massimiliano Merli, Pavia (IT); Roberto Carminati, Piancogno (IT); Nicolo' Boni, Mountain View, CA (US); Sonia Costantini, Lecco (IT); Carlo Luigi Prelini, Seveso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 323 days.

(21) Appl. No.: 18/220,554

(22) Filed: Jul. 11, 2023

(65) Prior Publication Data

US 2024/0019688 A1    Jan. 18, 2024

(30) Foreign Application Priority Data

Jul. 18, 2022   (IT) ........................ 102022000015055

(51) Int. Cl.
| | | |
|---|---|---|
| *G02B 26/08* | (2006.01) | |
| *B81B 3/00* | (2006.01) | |
| *B81C 1/00* | (2006.01) | |

(52) U.S. Cl.
CPC .......... *G02B 26/0858* (2013.01); *B81B 3/007* (2013.01); *B81C 1/00658* (2013.01); *B81B 2201/042* (2013.01)

(58) Field of Classification Search
CPC ........ G02B 26/00; G02B 26/06; G02B 26/08; G02B 26/0858; G02B 26/0841;

(Continued)

(56) References Cited

U.S. PATENT DOCUMENTS

| | | | |
|---|---|---|---|
| 2009/0284818 A1 | 11/2009 | Maekawa | |
| 2020/0192199 A1* | 6/2020 | Boni | ................. G02B 26/0858 |

FOREIGN PATENT DOCUMENTS

| | | |
|---|---|---|
| EP | 3666727 A1 | 6/2020 |
| EP | 3712676 A1 | 9/2020 |

(Continued)

OTHER PUBLICATIONS

IT Search Report and Written Opinion for priority application, IT Appl. No. 102022000015055, report dated Feb. 21, 2023, 7 pgs.

*Primary Examiner* — Jie Lei
(74) *Attorney, Agent, or Firm* — Crowe & Dunlevy LLC

(57) ABSTRACT

Disclosed herein is a micro-electro-mechanical mirror device having a fixed structure defining an external frame delimiting a cavity, a tiltable structure extending into the cavity, a reflecting surface carried by the tiltable structure and having a main extension in a horizontal plane, and an actuation structure coupled between the tiltable structure and the fixed structure. The actuation structure is formed by a first pair of actuation arms causing rotation of the tiltable structure around a first axis parallel to the horizontal plane. The actuation arms are elastically coupled to the tiltable structure through elastic coupling elements and are each formed by a bearing structure and a piezoelectric structure. The bearing structure of each actuation arm is formed by a soft region of a first material and the elastic coupling elements are formed by a bearing layer of a second material, the second material having greater stiffness than the first material.

20 Claims, 10 Drawing Sheets

(58) Field of Classification Search
CPC  G02B 26/0833; G02B 27/425; G02B 7/1821;
G02B 6/357; B81B 3/00; B81B 3/007;
B81B 3/0043; B81B 7/02; B81C 1/00;
B81C 1/00658; B81C 1/00134
USPC ......... 359/221.2, 221.5, 212.1, 223.1, 224.1,
359/225.1, 226.1, 226.2, 298, 318,
359/872–876
See application file for complete search history.

(56) References Cited

FOREIGN PATENT DOCUMENTS

| | | | |
|---|---|---|---|
| EP | 3839602 | A1 | 6/2021 |
| EP | 3974890 | A1 | 3/2022 |

\* cited by examiner

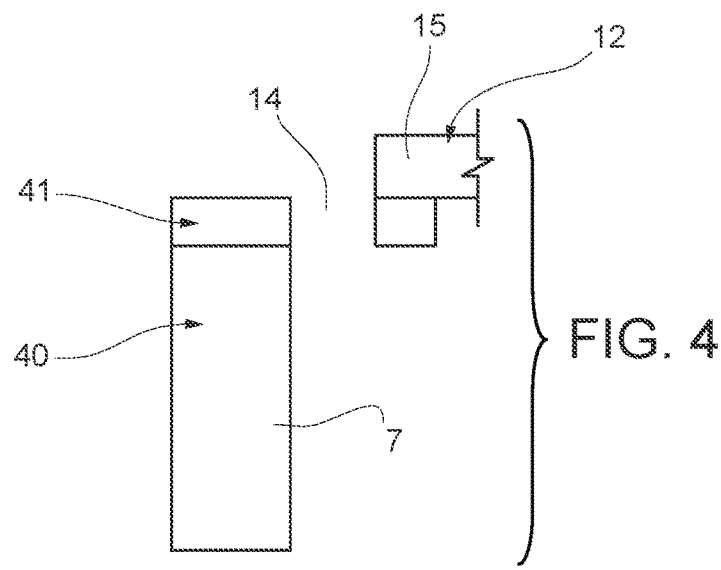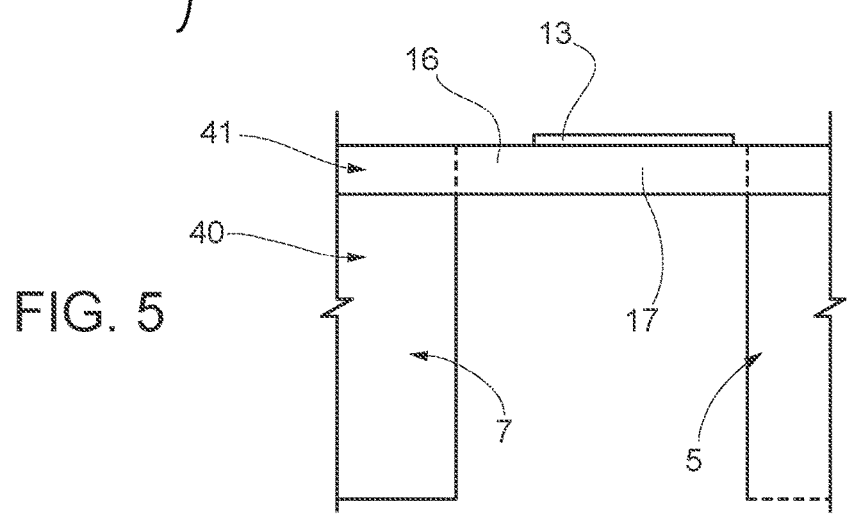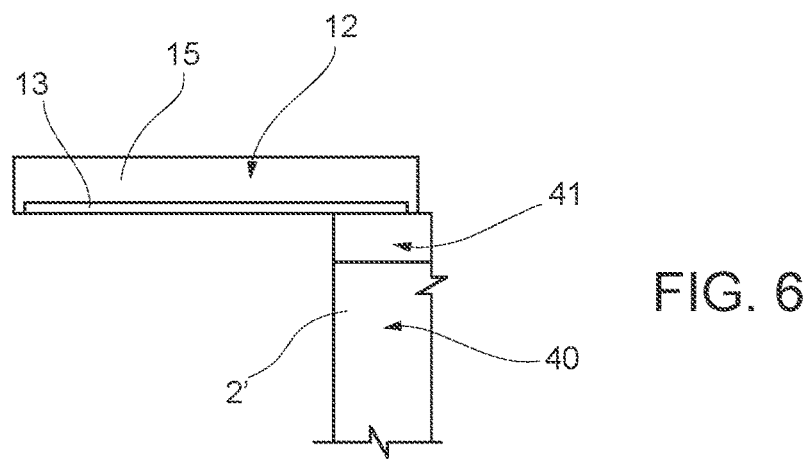

FIG. 18
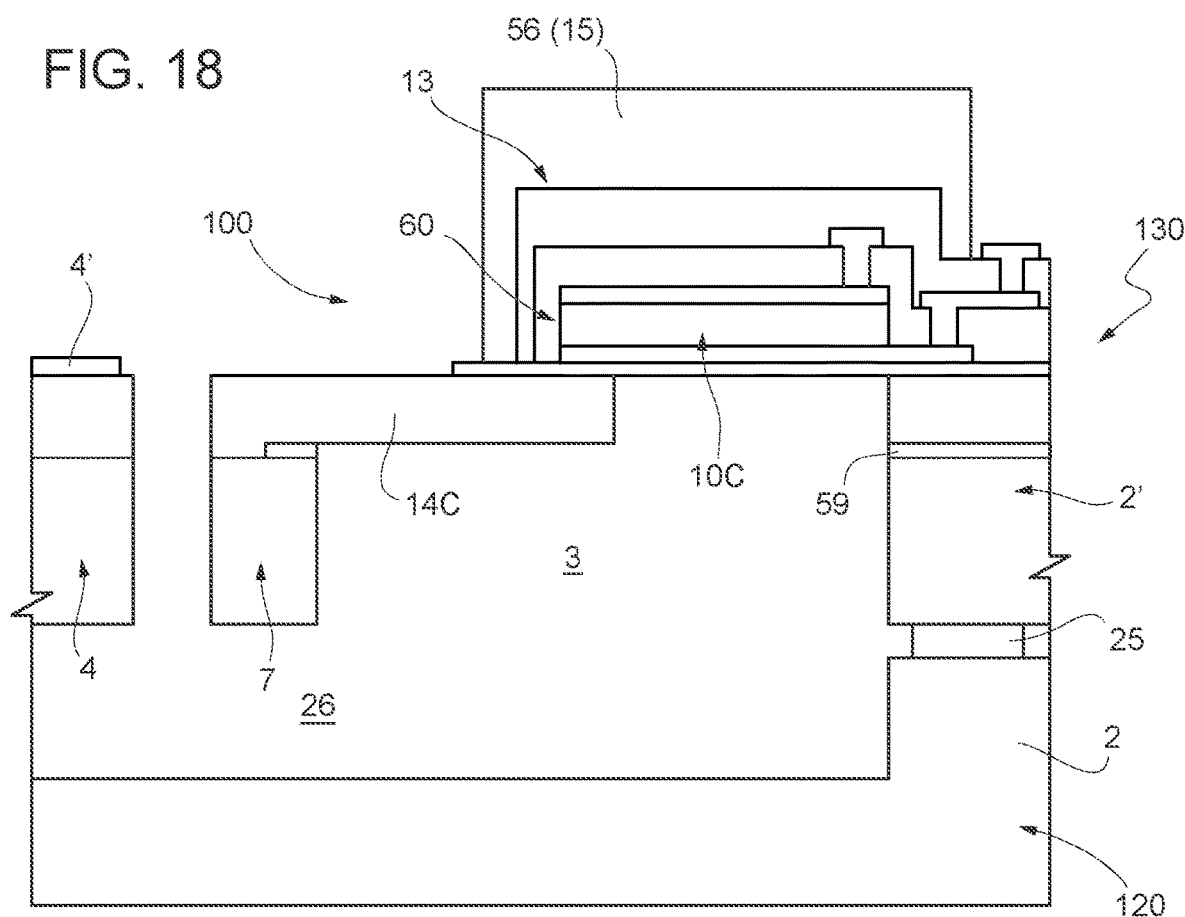
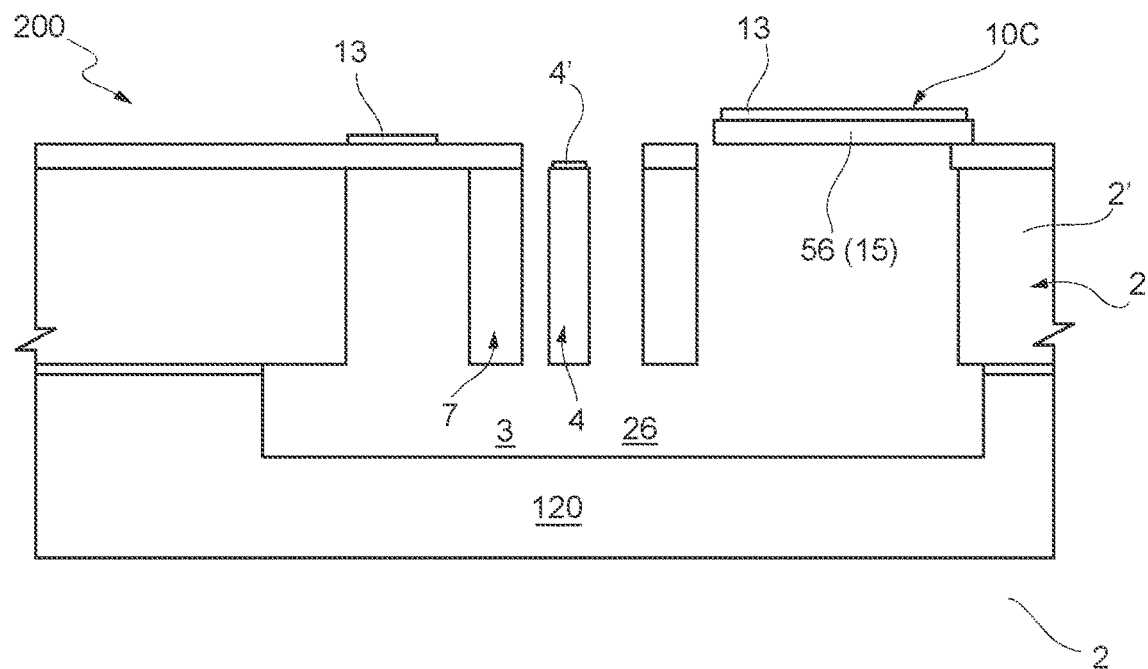
FIG. 19

MEMS MIRROR DEVICE WITH PIEZOELECTRIC ACTUATION AND MANUFACTURING PROCESS THEREOF

PRIORITY CLAIM

This application claims the priority benefit of Italian Application for Patent No. 102022000015055 filed on Jul. 18, 2022, the content of which is hereby incorporated by reference in its entirety to the maximum extent allowable by law.

TECHNICAL FIELD

This disclosure relates to a MEMS (micro-electro-mechanical systems) mirror device with piezoelectric actuation and to a process for manufacturing the MEMS mirror device.

BACKGROUND

MEMS mirror devices are used in portable apparatuses, such as smartphones, tablets, notebooks, and PDAs for optical applications to direct light radiation beams generated by a light source (for example laser) with desired modes. Thanks to their small size, these devices allow compliance with stringent requirements regarding space occupation, in terms of both area and thickness.

For example, MEMS mirror devices are used in miniaturized projector apparatuses (so-called picoprojectors), capable of projecting images from a distance and generating desired light patterns on a screen or on a similar display surface.

MEMS mirror devices generally include a tiltable structure carrying a reflecting or mirror surface of suitable material (e.g., aluminum, or gold, depending on whether the projection is in the visible or in the infrared). The tiltable structure may be elastically supported above a cavity and is manufactured from a semiconductor body so as to be movable, for example with tilt or rotation movement, out of a main extension plane to direct an impinging light beam in a desired manner.

The rotation of the tiltable structure is controlled through an actuation system which may be, for example, of an electrostatic, electromagnetic or piezoelectric type.

MEMS mirror devices with piezoelectric actuation have the advantage of utilizing reduced actuation voltages and power consumption as compared to devices with electrostatic or electromagnetic actuation. Furthermore, they allow providing piezoresistive sensor elements configured to detect the drive condition of the mirror and to provide a feedback signal to allow a feedback control of the same driving.

Typically, applications using MEMS mirror devices provide for a deflection of the light beam along two axes, which may be achieved by two uniaxial MEMS mirror devices, one arranged downstream (in the direction of light propagation) from the other, or by a single biaxial MEMS mirror device.

In the case of a biaxial device, the tiltable structure is configured to rotate around two axes; for example, it may rotate around a first axis with resonant movement, to generate a fast horizontal scan on the screen or display surface, and around a second axis with a linear or quasi-static movement (i.e., at a much lower frequency than the frequency of the resonant movement), to generate a slow vertical scan. In this manner, for example a line or raster scan may be obtained on the same screen or display surface.

Alternatively, the rotation around the second rotation axis may also occur at the resonance frequency, to generate a fast scan, in this case vertical, and overall, a so-called "Lissajous" scan pattern on the screen or display surface.

Some examples of MEMS mirror devices of biaxial type and with piezoelectric actuation are described for example in United States Patent Publication No. 2017/0155979 and United States Patent Publication No. 2023/0035607 (corresponding to European Patent No. 3,712,676 A1), the contents of both of which are incorporated by reference in their entirety.

In various cases, the tiltable structure (micromirror) is supported by an elastic structure (formed by elastic elements also called "springs") which transfer the scanning movement generated by the actuation system to the tiltable structure and which, to this end, deform elastically.

Generally, the elastic structures and the actuation structures are formed in the same semiconductor layer which forms the tiltable structure, monolithically therewith. Therefore, they have a thickness equal to that of the tiltable structure.

However, this is not optimal and may limit the performance of the MEMS device. In fact, on the one hand it is desired that the tiltable structure be stiff, so as to have a high robustness against shocks in the direction of thickness (and therefore it generally has a high thickness in this direction), and on the other hand it is desired that the elastic structures and the actuators have high actuation efficiency and effectively transfer the actuation movement to the tiltable structure, which strongly depends on their thickness.

Furthermore, even the optimal elastic characteristics of the actuation structure and the elastic parts are not the same: for the elastic structure it is desired to have an optimized stiffness for the efficient transmission of the actuation, shock robustness, and rejection of spurious modes activated by external excitation; for the actuation structure it is desired to have a low stiffness to improve the actuation efficiency. The optimal characteristics indicated for the elastic structure and for the actuation structure depend, inter alia, on the thickness of the respective structures, but in a different and conflicting manner.

Currently, therefore, the (equal) thickness of the tiltable structure, the elastic structure, and the actuation structure is chosen on the basis of a trade-off between the characteristics of stiffness and efficiency of the various structures.

A biaxial micro-electro-mechanical mirror device is described in Italian Patent Application No. 102022000004745, filed on Mar. 11, 2022 (corresponding to U.S. patent application Ser. No. 18/118,333), the contents of which are incorporated by reference in their entirety. In this device, the structures have three different thicknesses. The actuation structure and the elastic structures associated with a first rotation axis SA (forming a Slow, quasi static Axis) have a first thickness, and are formed in a first semiconductor layer which is thin, so as to operate at low working voltages; the tiltable structure and the elastic structures associated with a second rotation axis FA (forming a Fast Axis, at resonance frequency) have a second thickness, greater than the first thickness, and are formed in a second semiconductor layer, thicker than the first semiconductor layer, so as to have a high resonance frequency. Coupling frames and external frames are formed using both the first and the second semiconductor layers and therefore have maximum thickness.

While providing considerable advantages over previous MEMS mirror devices, in some applications, however, this approach does not allow the desired actuation efficiency to be achieved.

In fact, forming the actuation and elastic structures associated with the first rotation axis SA of the same thickness does not allow obtaining a high actuation efficiency of that axis (here, of the slow axis).

SUMMARY

The aim of this disclosure is to provide an approach which overcomes the drawbacks of the prior art. According to this disclosure, a MEMS device and the manufacturing process thereof are provided, as described hereinbelow.

A micro-electro-mechanical systems (MEMS) mirror device includes a fixed structure that forms an external frame, limiting a cavity. Extending into the cavity is a tiltable structure that carries a reflecting surface, primarily extending in a horizontal plane. An actuation structure is connected between the tiltable structure and the fixed structure. This actuation structure includes at least one first pair of actuation arms designed to promote rotation of the tiltable structure around a first rotation axis, which is parallel to the horizontal plane. These actuation arms are elastically connected to the tiltable structure through elastic coupling elements. Each actuation arm includes a bearing structure and a piezoelectric structure. The bearing structure of each actuation arm includes a first region of a first material. The elastic coupling elements include a bearing layer of a second material, which has a higher stiffness than the first material.

The second material can be silicon. Alternatively or additionally, the first material can be a polymeric material such as a dry film photoresist.

The bearing structure can include an extra layer of a third material, which has a stiffness equal to the second material. This additional layer can be arranged above or below the first region. The third material can be silicon oxide, silicon nitride, or a metal. In another embodiment, the bearing structure can include an additional layer of a third material, which has a stiffness greater than the first material and lower than the second material.

The device can be configured such that the piezoelectric structure overlays the cavity and the bearing structure overlays the piezoelectric structure, or the bearing structure overlays the cavity and the piezoelectric structure overlays the bearing structure.

The device can also include an internal frame that surrounds the tiltable structure. This internal frame can be rigidly connected to the tiltable structure and elastically connected to the at least one first pair of actuation arms through the elastic coupling elements.

The actuation structure can also include a pair of actuation arms designed to facilitate rotation of the tiltable structure around a second rotation axis, perpendicular to the first rotation axis and parallel to the horizontal plane. These actuation arms can be elastically connected to the internal frame through actuation elastic elements, with each arm including a bearing structure and a piezoelectric structure. In such a configuration, the tiltable structure, the fixed structure, the bearing structures of the actuation arms, and the actuation elastic elements can all be made of the second material.

The actuation arms of the at least one first pair of actuation arms can be elastically connected to the internal frame on opposite sides of the first rotation axis. Furthermore, the device can include a second pair of actuation arms arranged symmetrically to the at least one first pair of actuation arms with respect to the second rotation axis. The actuation arms of the second pair can be elastically connected to the tiltable structure on opposite sides of the first rotation axis, through elastic elements.

Finally, the tiltable structure can be designed to rotate around the first rotation axis with a quasi-static movement and to rotate around the second rotation axis with a resonant movement.

This disclosure also encompasses a method of manufacturing a micro-electro-mechanical systems (MEMS) mirror device. This process involves the formation of several components. Firstly, a fixed structure is formed that defines an external frame and delimits a cavity. Secondly, a tiltable structure is formed that extends into the cavity. Thirdly, a reflecting surface is formed that is carried by the tiltable structure and has a main extension in a horizontal plane. Lastly, an actuation structure is formed. This is coupled between the tiltable structure and the fixed structure and is configured to cause rotation of the tiltable structure around a first rotation axis parallel to the horizontal plane.

Forming the actuation structure involves creating at least one first pair of actuation arms and forming elastic coupling elements. Each of these elements elastically couples a respective first actuation arm of the at least one first pair of actuation arms to the tiltable structure. The formation of the at least one first pair of actuation arms involves forming a bearing structure and a piezoelectric structure. The bearing structure of each actuation arm includes of a first region of a first material, while the elastic coupling elements include a bearing layer of a second material. This second material has a greater stiffness than the first material.

The manufacturing process can include additional steps. For example, on a semiconductor material wafer with a first and a second face, a piezoelectric region and a first region can be formed on the first face. The semiconductor material of the wafer can be partially removed from the second face to form the cavity and define the fixed structure, the tiltable structure, and the elastic coupling elements of the at least one first pair of actuation arms. The semiconductor material of the wafer below the at least one first pair of actuation arms can be completely removed.

The formation of a piezoelectric structure can involve the formation and patterning of a first electrode layer, a piezoelectric layer, and a second piezoelectric layer. The formation of a bearing structure can involve forming a first region of a material, such as a polymeric material, above or below the piezoelectric structure.

Also disclosed herein is a micro-electro-mechanical systems (MEMS) mirror device. The device includes a frame that surrounds a cavity, and within this cavity extends a mirror element. This mirror element is rotatable and carries a reflecting surface that extends in a horizontal plane. The device also includes an actuation component that establishes a connection between the mirror element and the frame. This actuation component features at least one pair of actuation arms that enable the mirror element to rotate around an axis that is parallel to the horizontal plane. These actuation arms are elastically connected to the mirror element via elastic coupling elements. Each actuation arm includes a bearing structure and a piezoelectric structure. The bearing structure of each actuation arm contains a first region made from a first material. The elastic coupling elements incorporate a bearing layer that is made from a second material, which is stiffer than the first material.

The MEMS mirror device may include an internal frame that surrounds the mirror element. This internal frame is rigidly connected to the mirror element and is elastically connected to the actuation arms via the elastic coupling elements.

The actuation component may have another pair of actuation arms. These arms facilitate rotation of the mirror element around a second rotation axis that is parallel to the horizontal plane and perpendicular to the first rotation axis. These arms are elastically connected to the internal frame via actuation elastic elements, with each actuation arm having a bearing structure and a piezoelectric structure. The mirror element, frame, bearing structures of the arms, and actuation elastic elements are all made of the second material.

The actuation arms of the first pair may be elastically connected to the internal frame on opposite sides of the first rotation axis. The device also includes a second pair of actuation arms that are symmetric to the first pair of actuation arms in relation to the second rotation axis. The actuation arms of the second pair are elastically connected to the mirror element on opposite sides of the first rotation axis, through elastic elements.

BRIEF DESCRIPTION OF THE DRAWINGS

For a better understanding, some embodiments thereof are now described, purely by way of non-limiting example, with reference to the attached drawings, wherein:

FIG. 4 is a cross-section of the micro-electro-mechanical device of FIG. 1, taken along section line IV-IV of FIG. 2;

FIG. 5 is a cross-section of the micro-electro-mechanical device of FIG. 1, taken along section line V-V of FIG. 2;

FIG. 6 is a cross-section of the micro-electro-mechanical device of FIG. 1, taken along section line VI-VI of FIG. 2;

FIGS. 8-18 show cross-sections of half of the micro-electro-mechanical device disclosed herein, similar to FIG. 7, in successive steps of the manufacturing process;

FIG. 19 is a cross-section, similar to FIG. 3, of a different embodiment of the micro-electro-mechanical device disclosed herein.

DETAILED DESCRIPTION

The following description refers to the arrangement shown; consequently, expressions such as "above", "below", "top", "bottom", "right", "left" relate to the attached Figures and are not to be interpreted in a limiting manner, except where explicitly indicated.

Figure 1:
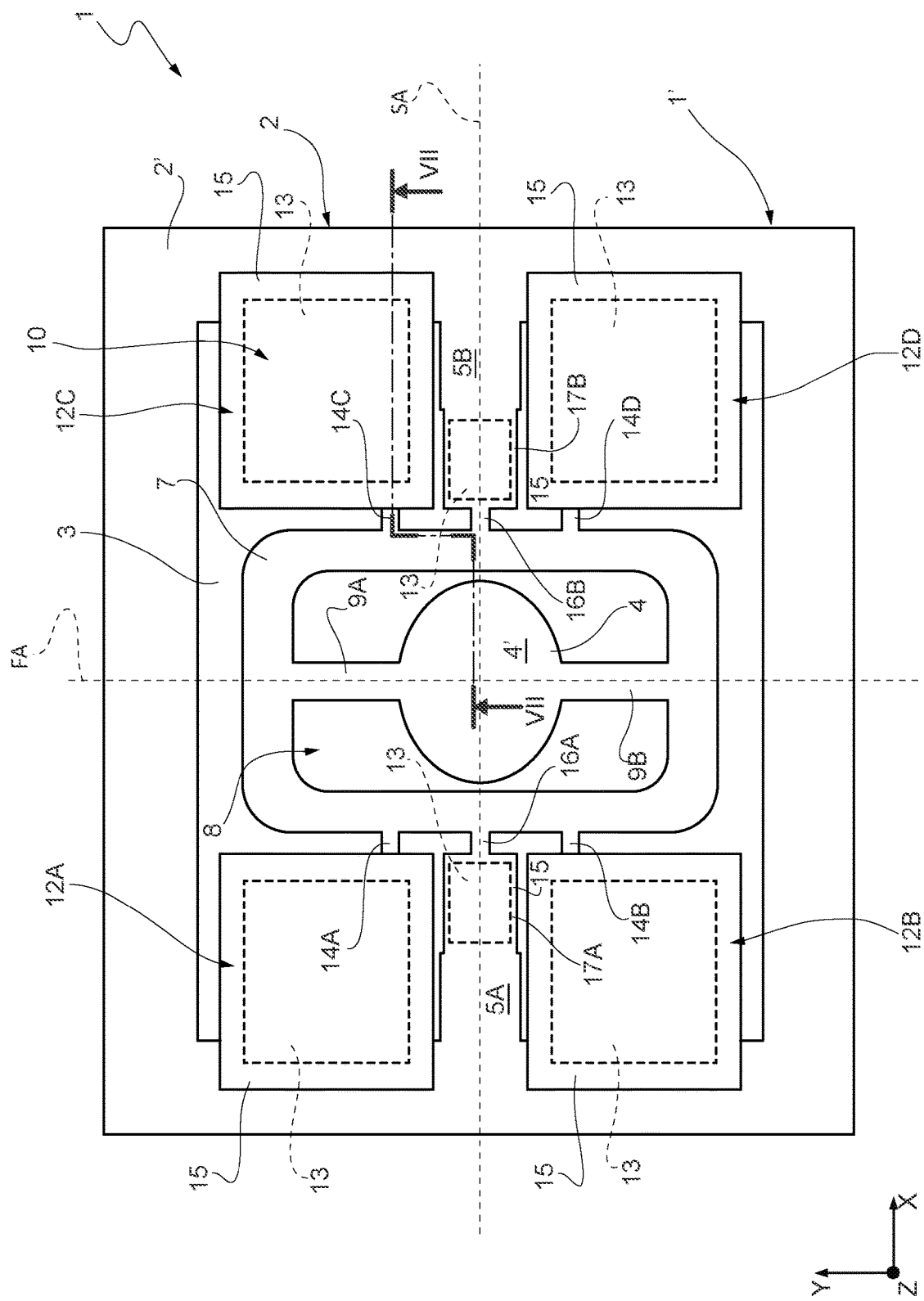
FIG. 1 is a schematic top-plan view of the micro-electromechanical device disclosed herein.
Figure 2:
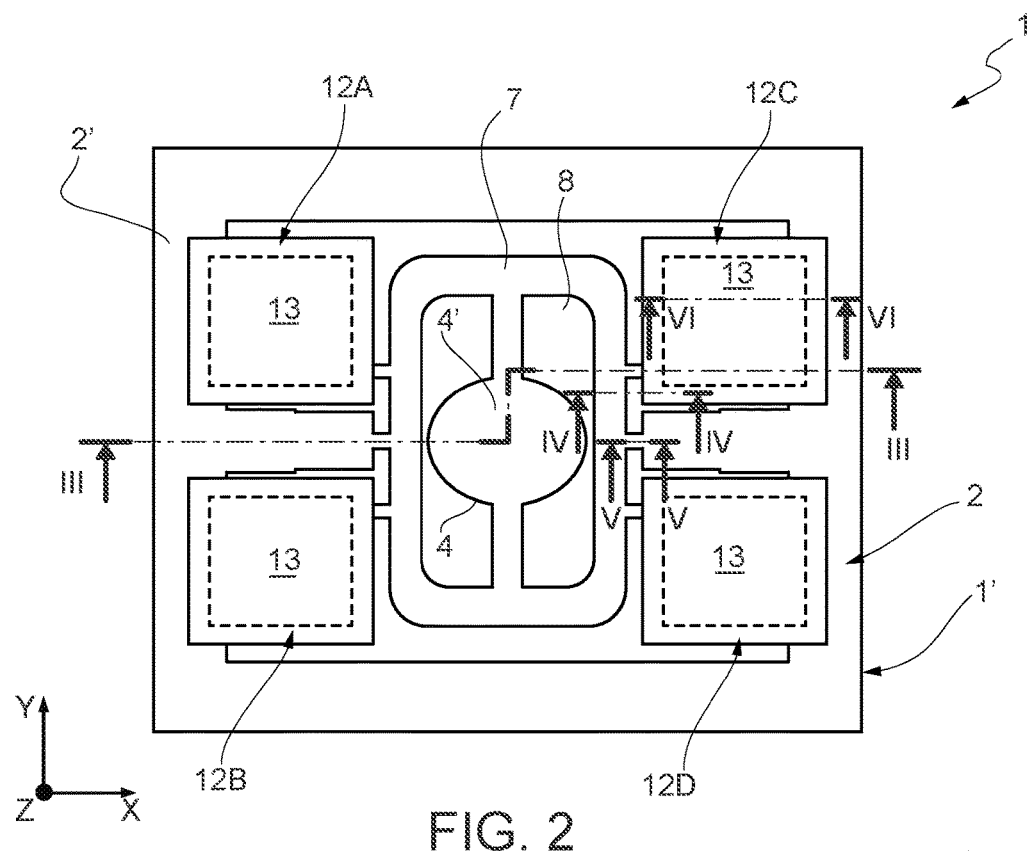
FIG. 2 is a top view similar to FIG. 1, showing certain section planes.

FIG. 1 shows a micro-electro-mechanical mirror device 1, of biaxial type, manufactured using MEMS technology, hereinafter also referred to as device 1.

The device 1 is formed in a die 1' of semiconductor material, in particular silicon, and comprises a fixed structure 2, defined in the die 1'. In particular, the fixed structure 2 forms an external rim or frame 2' which delimits and surrounds a cavity 3.

The fixed structure 2 is suspended above the cavity 3 and is elastically coupled to a tiltable structure 4, having a top surface (for example of circular or elliptical shape) extending in a horizontal plane XY of a Cartesian coordinate system XYZ. The tiltable structure 4 is arranged here so as to rotate around a first rotation axis SA, parallel to a first horizontal axis X of the horizontal plane XY, and around a second rotation axis FA, parallel to a second horizontal axis Y of the same horizontal plane XY.

For example, the first rotation axis SA represents a Slow Axis, quasi statically actuated, while the second rotation axis FA represents a Fast Axis, actuated at resonance. The first and the second rotation axes SA, FA also represent first and second median symmetry axes for the device 1.

The tiltable structure 4 carries at the top a reflecting surface 4', defining a mirror surface and having main extension in the horizontal plane XY.

The fixed structure 2 forms a first and a second support (or anchor) element 5A, 5B, extending longitudinally along the first rotation axis SA, from the external frame 2' inside the cavity 3, towards the tiltable structure 4, on opposite sides thereof.

The micro-electro-mechanical mirror device 1 further comprises an internal frame 7 extending over the cavity 3.

In the illustrated embodiment and in top-plan view, the internal frame 7 has an elongated shape along the second horizontal axis Y; in particular, here, the internal frame 7 has a generally rectangular shape, with short sides arranged along the first horizontal axis X and long sides arranged along the second horizontal axis Y.

The internal frame 7 internally defines a window 8; the tiltable structure 4 is arranged inside the window 8 and is elastically coupled to the internal frame 7 by first and second suspension elastic elements 9A, 9B, compliant to torsion around the second rotation axis FA.

In the illustrated embodiment and in top view of FIG. 1, the first and second suspension elastic elements 9A, 9B have a linear extension, extending along the second rotation axis FA, parallel to the second horizontal axis Y, on opposite sides with respect to the tiltable structure 4, from the tiltable structure 4 to a respective short side of the internal frame 7.

As discussed in detail below, the internal frame 7 is elastically coupled to the first and second support elements 5A, 5B.

The device 1 further comprises an actuation structure 10, coupled to the tiltable structure 4 and configured to cause the rotation thereof around the first rotation axis SA and around the second rotation axis FA, in a substantially decoupled manner.

The actuation structure 10 is in general arranged between the internal frame 7 and the external frame 2' of the fixed structure 2, and also helps to support the same internal frame 7 on the cavity 3.

The actuation structure 10 comprises a first pair of actuation arms that may be driven to cause the rotation of the tiltable structure 4 around the first rotation axis SA, in this case with a quasi-static movement.

The first pair of actuation arms is therefore here formed by first and second slow actuation arms 12A, 12B, arranged on opposite sides of the first rotation axis SA, symmetrically thereto, and therefore of the first support element 5A.

In the embodiment illustrated in FIG. 1, the slow actuation arms 12A, 12B of the first pair have a generally rectangular shape, with greater extension along the first horizontal axis X.

In the device 1, the first and the second slow actuation arms 12A, 12B are coupled integrally and directly, on an own first side, to the external frame 2' of the fixed structure 2; they are also coupled on an own second side, opposite to the first, to the internal frame 7, in an elastic manner, by first and second transmission elastic elements 14A, 14B.

Each slow actuation arm 12A, 12B is suspended above the cavity 3 and comprises, as explained in more detail below, a piezoelectric structure 13 (represented with a dashed line in FIG. 1) and a bearing structure 15.

Figure 7:
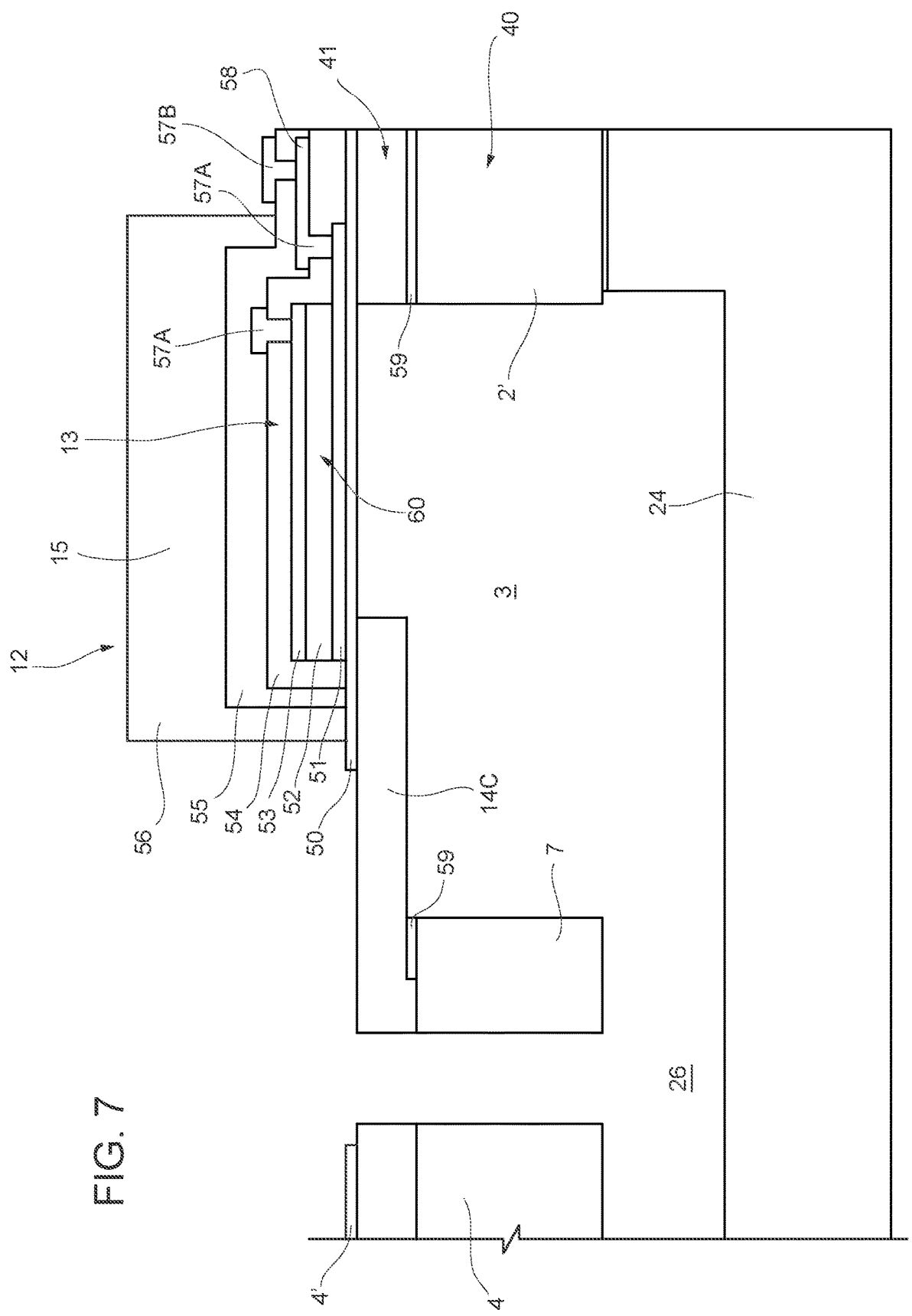
FIG. 7 is a cross-section of the micro-electro-mechanical device of FIG. 1, taken along section line VII-VII of FIG. 1.

In particular, and as shown in detail in FIG. 7, each bearing structure 15 is coupled to the external frame 2' and to the transmission elastic elements 14A, 14B, and each piezoelectric structure 13 has an extension, in the horizontal plane XY, slightly smaller than the slow actuation arms 12A, 12B.

The first and second transmission elastic elements 14A, 14B have a high stiffness with respect to movements out of the horizontal plane XY (along the vertical axis Z) and are compliant with respect to torsion around rotation axes parallel to the first rotation axis SA.

In the embodiment illustrated in FIG. 1, the first and second transmission elastic elements 14A, 14B are of linear type and extend parallel to the first horizontal axis X, between the first and second slow actuation arms 12A, 12B and a same long side of the internal frame 7, in proximity of the first rotation axis SA, at a reduced distance from the same first rotation axis SA.

As an alternative to what shown, the first and second transmission elastic elements 14A, 14B may be of folded type, in a manner that will be understood by the person skilled in the art.

The actuation structure 10 also comprises a second pair of actuation arms, that may also be driven to cause the rotation of the tiltable structure 4 around the first rotation axis SA with a quasi-static movement.

The second pair of actuation arms is here formed by third and fourth slow actuation arms 12C, 12D, arranged on the opposite side with respect to the first rotation axis SA and the second support element 5B.

Similarly to the first and the second slow actuation arms 12A, 12B, the third and fourth slow actuation arms 12C, 12D have, in top-plan view, a longitudinal extension parallel to the first horizontal axis X and to the second support element 5B. In practice, the second pair of slow actuation arms 12C, 12D is arranged symmetrically to the first pair of slow actuation arms 12A, 12B with respect to the second rotation axis FA.

Furthermore, each slow actuation arm 12C, 12D of the second pair is integrally coupled, at an own side, to the external frame 2' of the fixed structure 2 and is elastically coupled, at an opposite side, to the internal frame 7 through third and fourth transmission elastic elements 14C, 14D.

Similarly to the first and the second slow actuation arms 12A, 12B and as discussed in detail hereinafter, the third and fourth slow actuation arms 12C, 12D each comprises its own piezoelectric structure 13 (represented by a dashed line in FIG. 1) and its own bearing structure 15.

Furthermore, the third and the fourth transmission elastic elements 14C, 14D are also, in the embodiment shown, of linear type, but may be formed as folded springs.

As also discussed hereinafter, each slow actuation arm 12A-12D of the first and second pairs has a different elastic behavior with respect to the respective transmission elastic element 14A-14D, in particular it is of different material, so as to optimize the elastic characteristics of both the actuation arms 12A-12D and the respective transmission elastic elements 14A-14D according to their respective function.

The actuation structure 10 further comprises a third pair of actuation arms, here formed by first and second fast actuation arms 17A, 17B, that can be driven to cause the rotation of the tiltable structure 4 around the second rotation axis FA, with resonant movement.

The first and second fast actuation arms 17A, 17B are interposed between the first and second support elements 5A, 5B and the internal frame 7.

In particular, the first and second fast actuation arms 17A, 17B are elastically coupled to the internal frame 7 by first and second torsional elastic elements 16A, 16B, having a high stiffness with respect to movements out of the horizontal plane XY (along the orthogonal axis Z) and compliant to torsion around the first rotation axis SA.

In the illustrated embodiment, and in top-plan view, the first and second fast actuation arms 17A, 17B have a generally rectangular shape, with greater extension along the first horizontal axis X.

In particular, the first and second fast actuation arms 17A, 17B have a first end integrally coupled to the first and second support elements 5A, 5B (whereof they are an extension) and a second end elastically coupled to the internal frame 7 by the first and second torsional elastic elements 16A, 16B.

Furthermore, the first and second torsional elastic elements 16A, 16B extend along the first rotation axis SA, between the second end of the first and second fast actuation arms 17A, 17B and a respective long side of the internal frame 7 they are coupled to, at a respective central portion.

In the illustrated embodiment, the first and second torsional elastic elements 16A, 16B are of linear type; however, they may be of folded type.

Similarly to what discussed for the first and the second pairs of actuation arms, each fast actuation arm 17A, 17B comprises a bearing structure 15 (here of silicon) and a respective piezoelectric structure 13.

In a manner not illustrated, the device 1 further comprises a plurality of pads, carried by the fixed structure 2 at the external frame 2', electrically connected to the piezoelectric structures 13 of the slow actuation arms 12A-12D and to the fast actuation arms 17A, 17B by electrical connection lines, to allow the electrical biasing thereof by electrical signals coming from the outside of the same electro-mechanical device 1 (for example from a biasing device of an electronic apparatus having the device 1 integrated therein).

Figure 3:
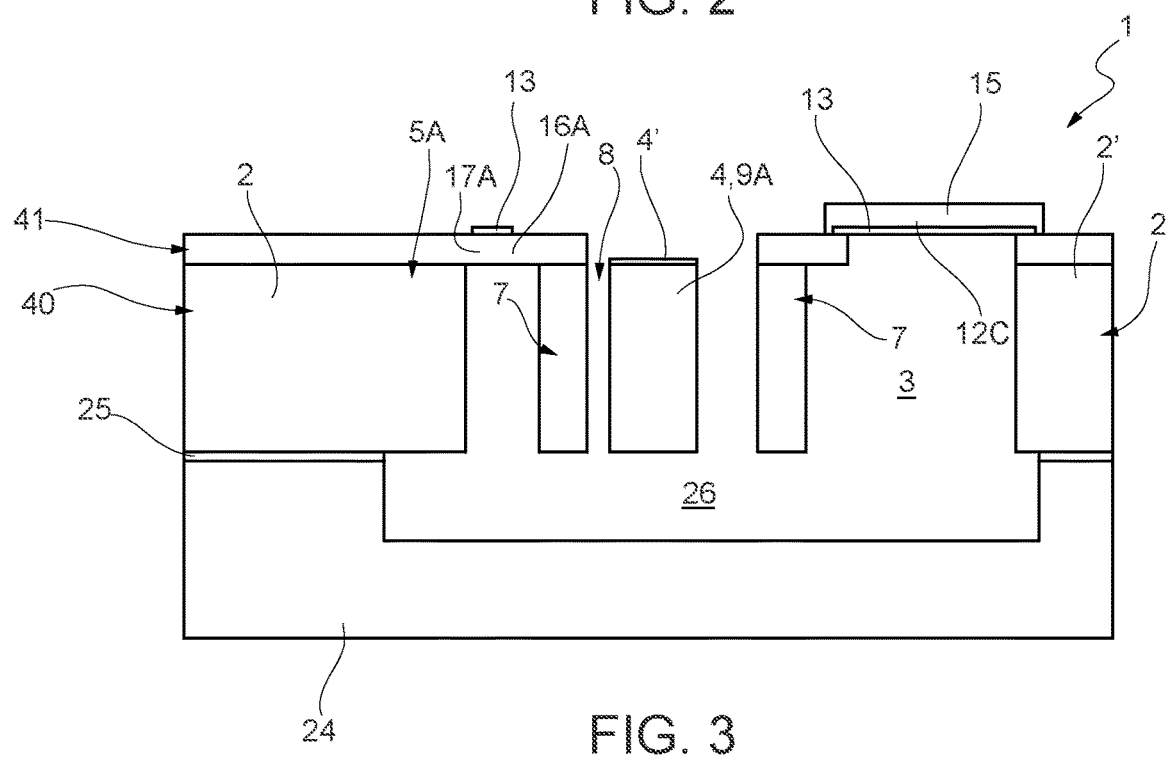
FIG. 3 is a cross-section of the micro-electro-mechanical device of FIG. 1, taken along section line III-III of FIG. 2.

As shown in FIG. 3, a support wafer (or cap) 24 is also coupled below the fixed structure 2, through a suitable bonding region 25, and has a recess 26, below the cavity 3 and at the tiltable structure 4, to allow the rotation of the tiltable structure 4.

As shown in the sections of FIGS. 3-7, in the device 1, the bearing structure 15 of the slow actuation arms 12A-12D is not formed in the same silicon layer as the bearing structures 15 of the fast actuation arms 17A, 17B and of the transmission elastic elements 14A-14D, but in a distinct layer, of more resilient material (having a lower Young's modulus), in particular a polymeric material such as dry film photoresist.

In particular, with reference to FIG. 3, the die 1' comprises a first semiconductor layer, here silicon, generally indicated by 40 and forming the bottom part of the internal frame 7, of the fixed structure 2 and of the support elements 5A, 5B, as well as the tiltable structure 4 and the suspension elastic elements 9A, 9B (see also FIG. 1); and a second semiconductor layer, here also silicon, generally indicated by 41 and forming the top part of the internal frame 7, of the support elements 5A, 5B and of the fixed structure 2, as well as the torsional elastic elements 16A, 16B and the bearing structures 15 of the fast actuation arms 17A, 17B.

The semiconductor layers 40, 41 are completely removed at the slow actuation arms 12A-12D and therefore each piezoelectric structure 13 is suspended below the respective bearing structure 15, as visible in the schematic representations of FIGS. 3, 4, 6 and 7, as described in detailed below.

In particular, FIG. 4 shows a cross-section of the device 1 taken through the third transmission elastic element 14C (but the same section is applicable for the other transmission elastic elements 14A, 14B and 14D and therefore FIG. 4 and the following description refer to a generic transmission elastic element 14). As noted, the transmission elastic element 14 extends between the internal frame 7 and the bearing structure 15 of the respective actuation arm (here generically indicated by 12) and is formed by the second semiconductor layer 41 (i.e. the underlying first semiconductor layer 40 is removed). The transmission elastic elements 14 therefore have elasticity and robustness characteristics linked to the semiconductor material used (here silicon) and to the thickness of the second semiconductor layer 41.

FIG. 5 shows a cross-section of the device 1 taken through the second torsional elastic element 16B (but the same section is applicable to the first torsional elastic element 16A and therefore FIG. 5, and the following description refer to a generic torsional elastic element 16). As noted, the torsional elastic element 16 extends between the internal frame 7 and the respective fast actuation arm (here generically indicated by 17) and is formed by the sole second semiconductor layer 41. The torsional elastic elements 16 therefore have elasticity and robustness characteristics linked to the used semiconductor material (here silicon) and to the thickness of the second semiconductor layer 41, similarly to the transmission elastic elements 14. The bearing structures 15 of the fast actuation arms 17 are also formed by the second semiconductor layer 41 and here have a thickness equal to the respective transmission elastic elements 14.

FIG. 6 shows a cross-section of the device 1 taken through the third slow actuation arm 12C (but the same section is applicable for the other slow actuation arms 12A, 12B and 12D and therefore FIG. 6 and the following description refer to a generic slow actuation arm 12). As noted, the slow actuation arm 12, coupled between the respective transmission elastic element 14 (not visible in FIG. 6) and the external frame 2', is formed by the bearing structure 15 and by the piezoelectric structure 13. Since the slow actuation arms 12 are of material different from the semiconductor material of the transmission elastic elements 14 and of the torsional elastic elements 16, they may be designed in a dedicated manner; in particular, the use of a polymeric material allows an optimal stiffness value to be set on the basis of the characteristics of the material and by a suitable choice of its thickness.

In a possible embodiment of the device 1, the thickness of the first semiconductor layer 40 may be comprised between 100 μm and 400 μm, for example 110 μm; the thickness of the second semiconductor layer 41 may be comprised between 10 μm and 50 μm, for example 30 μm; and the thickness of the bearing structure 15 may be comprised between 10 μm and 60 μm, for example 40 μm.

FIG. 7 shows a possible implementation of the piezoelectric structure 13, not to scale (in general, the layers of the piezoelectric structure 13 are much thinner than the bearing structure 15 and have a small impact on the stiffness thereof; in any case, the overall stiffness of the slow actuation arms 12 may be designed considering the entire structure, in a manner understood by the person skilled in the art).

The piezoelectric structure 13 may be provided and comprise PZT—Lead Zirconate Titanate.

In detail, with reference to FIG. 7, the piezoelectric structure 13 here comprises:

a first dielectric region 50, extending above the second semiconductor layer 41 and superimposed thereon at the sides of the slow actuation arms 12 coupling to the external frame 2' and to the internal frame 7, as previously described with reference to FIG. 1;

a bottom electrode region 51, of conductive material, arranged above the first dielectric region 50;

a piezoelectric region 52 (for example formed by a thin film of PZT), arranged on the bottom electrode region 51;

a top electrode region 53, of conductive material, arranged on the piezoelectric region 52 (the bottom electrode region 51, the piezoelectric region 52 and the top electrode region 53 forming a piezoelectric stack 60);

a second dielectric region 54, superimposed on the top electrode region 53 and also laterally surrounding the piezoelectric stack 60; and a third dielectric region 55, superimposed on and surrounding the second dielectric region 54.

The third dielectric region 55 is surrounded by a soft region 56, of polymeric material, which forms the bearing structure 15.

First and second contacts 57A, 57B are formed through the second or the third dielectric regions 54, 55 and are connected to conductive lines (a track 58 shown partially) and to metal regions, not shown, in a first metallization level of the device for the electrical connection of the electrode regions 51, 53, as discussed above.

As noted, the end sides of the soft region 56 visible in FIG. 7 are superimposed on the transmission elastic element 14 and on the frame 2'.

FIG. 7 also shows oxide regions 59 interposed between the first and the second semiconductor layers 40, 41, for the reasons explained below.

As described in detail in aforementioned Italian Patent Application No. 102022000004745, during the operation of the device 1, the application of a biasing voltage to the piezoelectric structure 13 of the first/third slow actuation arm 12A/12C, having a positive value with respect to the bias of the piezoelectric structure 13 of the second/fourth slow actuation arm 12B/12D, causes a rotation of the internal frame 7 and of the tiltable structure 4, coupled thereto, in a first direction around the first rotation axis SA (with consequent torsional deformation of the torsional elastic elements 16A, 16B).

Correspondingly, the application of a biasing voltage to the piezoelectric structure 13 of the second/fourth slow actuation arm 12B/12D, having a positive value with respect to the bias of the piezoelectric structure 13 of the first/third slow actuation arm 12A/12C, causes a corresponding rotation of the internal frame 7 and of the tiltable structure 4 in a second direction, opposite to the first, around the same first rotation axis SA.

During the rotation around the first rotation axis SA, the tiltable structure 4 is integrally coupled to the internal frame 7 (due to the stiffness of the suspension elastic elements 9A, 9B with respect to this movement), so rotate therewith and cause the desired movement of the reflecting surface 4' with respect to the first rotation axis SA. In other words, the suspension elastic elements 9A, 9B do not undergo deformations due to the rotation of the internal frame 7 around the first rotation axis SA.

In this step, the bearing structures 15 of the slow actuation arms 12A, 12B, and 12C, 12D may easily deform and require a low deformation force, due to the lower stiffness, compared to the respective transmission elastic elements 14. They are therefore capable of generating the desired rotational movement with high efficiency.

Conversely, the transmission elastic elements 14 have a high stiffness with respect to movements out of the horizontal plane XY (along the orthogonal axis z). They therefore transfer this rotation movement with high efficiency.

As described in aforementioned Italian Patent Application No. 102022000004745, the rotation of the tiltable structure 4 around the second rotation axis FA occurs by applying a biasing voltage to the piezoelectric structure 13 of at least one of the first and the second fast actuation arms 17A, 17B (with phase-opposition bias when both arms are actuated). This rotation generally occurs at the resonance frequency of the tiltable structure 4.

In this case, in fact, the force along the vertical axis Z generated by biasing the piezoelectric structures 13 of the first/second fast actuation arm 17A, 17B is transmitted to the internal frame 7, with torsional deformation of the suspension elastic elements 9A, 9B.

During this rotation, the transmission elastic elements 14, compliant with respect to torsion around rotation axes parallel to the first rotation axis SA, minimally transfer their deformation to the slow actuation arms 12 which are therefore practically not affected by the rotation of the tiltable structure 2 around the second rotation axis FA.

The device 1 may be manufactured as described hereinbelow, with reference to FIGS. 8-18, taken along section plane VII-VII of FIG. 1.

Figure 8:
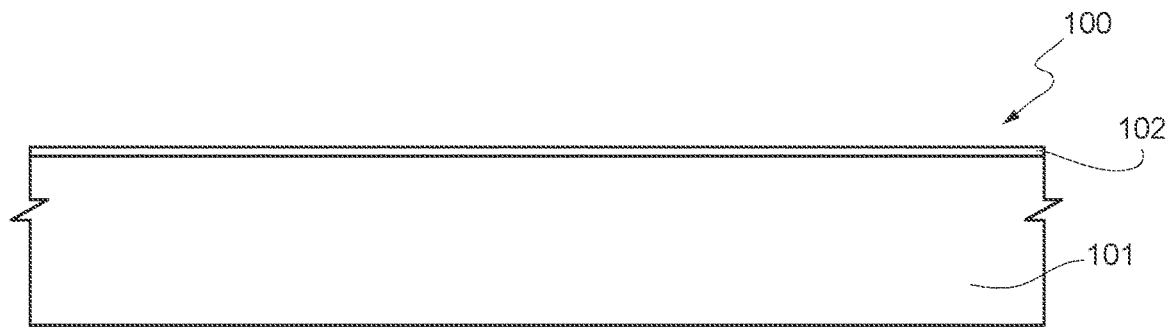

With reference to FIG. 8, a semiconductor wafer 100 comprises a substrate 101 of semiconductor material, here of monocrystalline silicon, intended to form the first semiconductor layer 40 of FIGS. 3-7.

A barrier layer 102, for example of silicon oxide, is formed, for example deposited, on the substrate 101.

Figure 9:
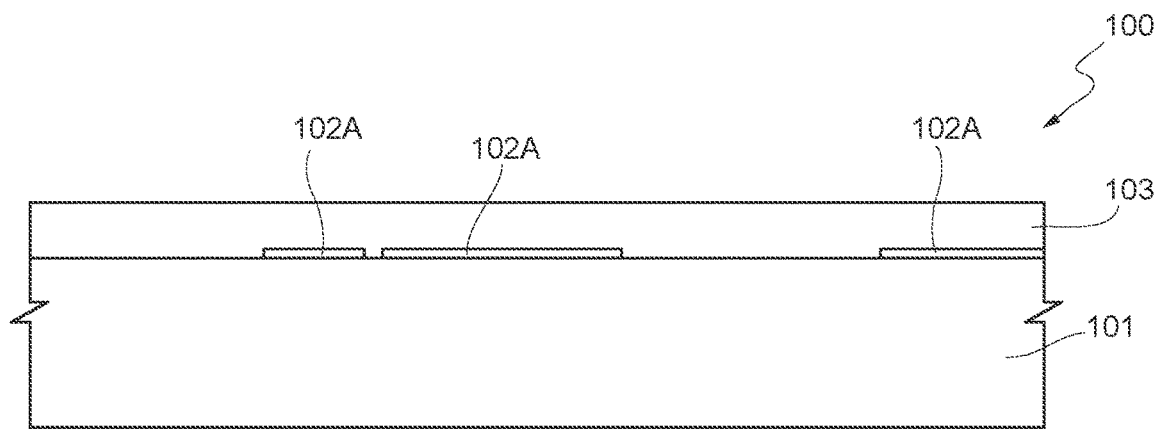

Then, FIG. 9, the barrier layer 102 is patterned, using standard photolithography steps, to form barrier regions 102A, forming, inter alia, the oxide regions 59 of FIG. 7.

Figure 10:
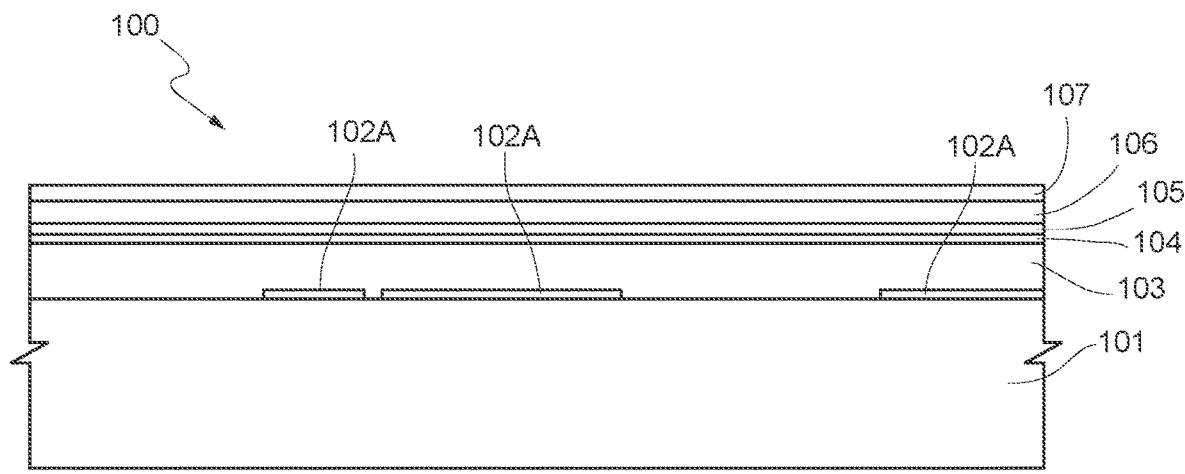

In FIG. 10, a bearing layer 103 of semiconductor material, here silicon, intended to form the second semiconductor layer 41, is epitaxially grown and planarized. A first dielectric layer 104, a first electrode layer 105, a piezoelectric layer 106 and a second electrode layer 107, are formed, in sequence, on the bearing layer 103.

Figure 11:
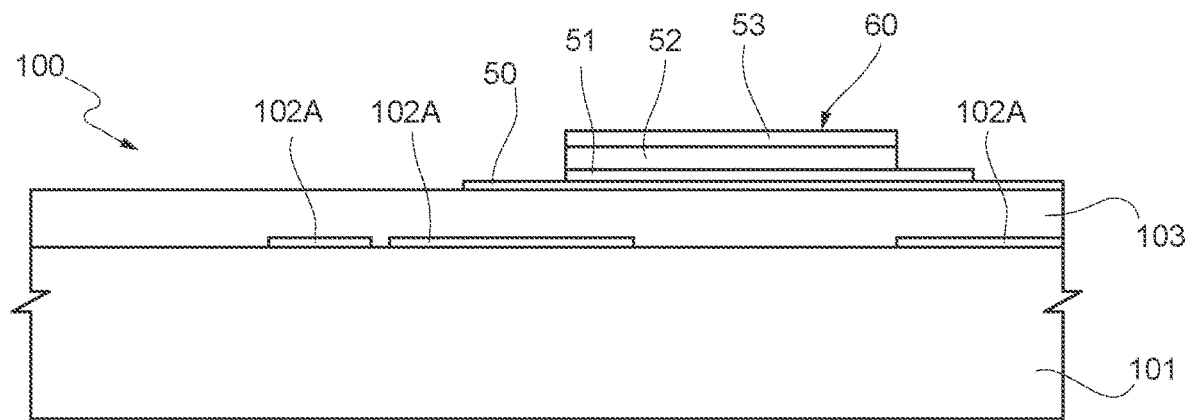

In FIG. 11, the layers 104-107 are patterned, using standard photolithography steps; in particular, here, the second electrode layer 107 and the piezoelectric layer 106 are first etched, in an aligned manner; then the first electrode layer 105 and subsequently the first dielectric layer 104 are etched, thus forming, respectively, the top electrode region 53, the piezoelectric region 52, the bottom electrode region 51 and the first dielectric region 50 of FIG. 7, completing the piezoelectric stack 60.

Figure 12:
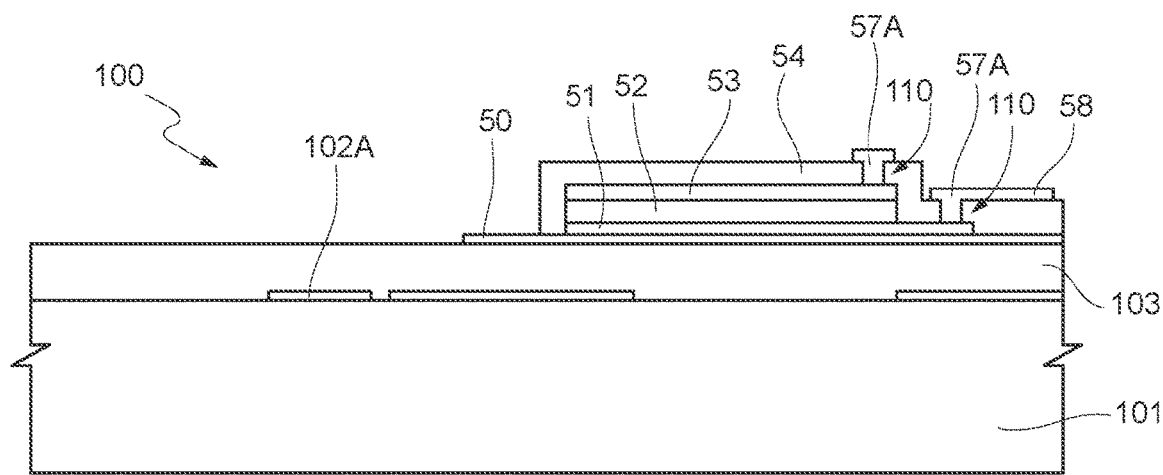

In FIG. 12, a second dielectric layer is deposited and patterned, so as to form the second dielectric region 54; the second dielectric region 54 has openings 110 which reach the top electrode region 53 and the bottom electrode region 51.

Then metal connection material (for example aluminum) is deposited and patterned, forming the first contacts 57A and the conductive tracks 58 coupled thereto.

Figure 13:
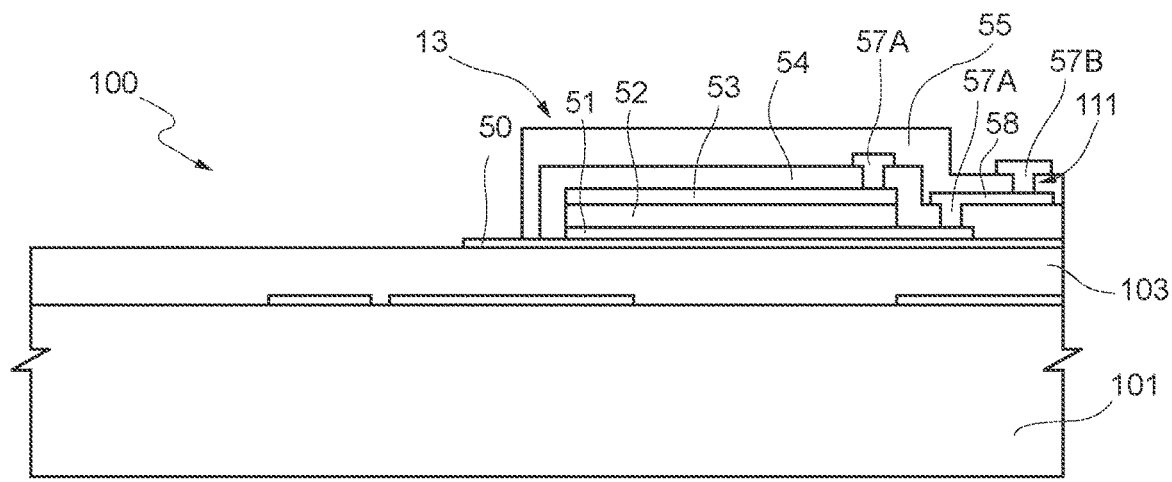

In FIG. 13, a third dielectric layer is deposited and patterned, so as to form the third dielectric region 55 and openings 111 which reach the conductive tracks 58. Subsequently, the second contacts 57B (one visible) are formed, in a similar manner to the first contacts 57A. The piezoelectric structure 13 is thus formed.

Figure 14:
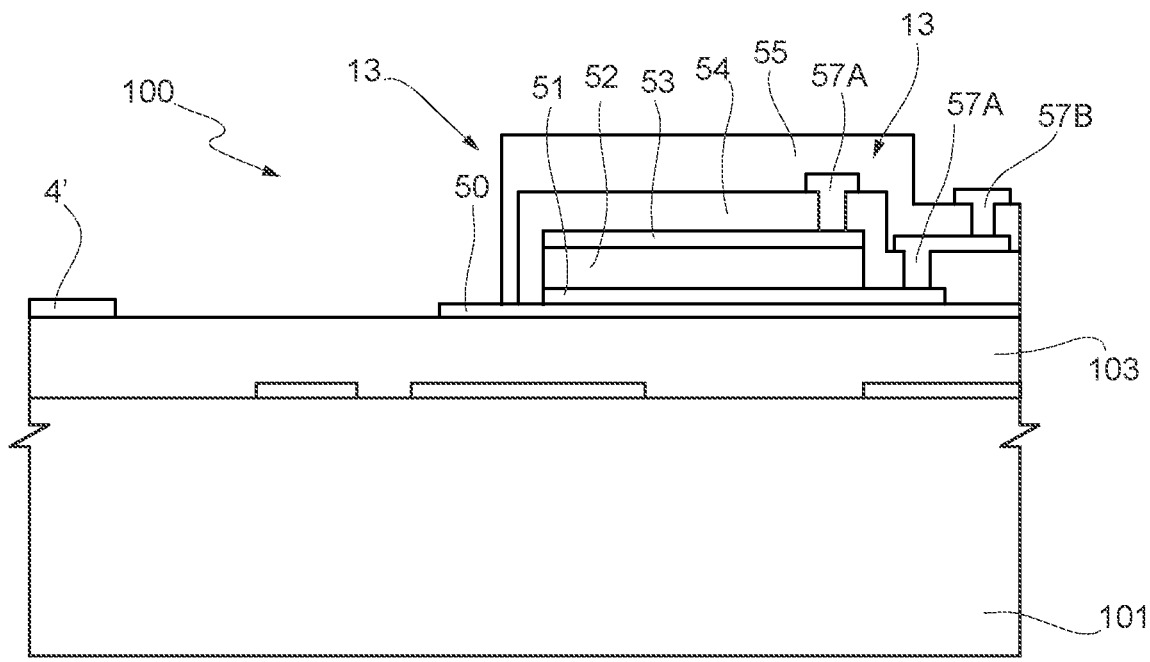

In FIG. 14, a reflecting layer (e.g., of aluminum or gold, depending on whether the projection is in the visible or in the infrared) is deposited and patterned to form the reflecting surface 4'.

Figure 15:
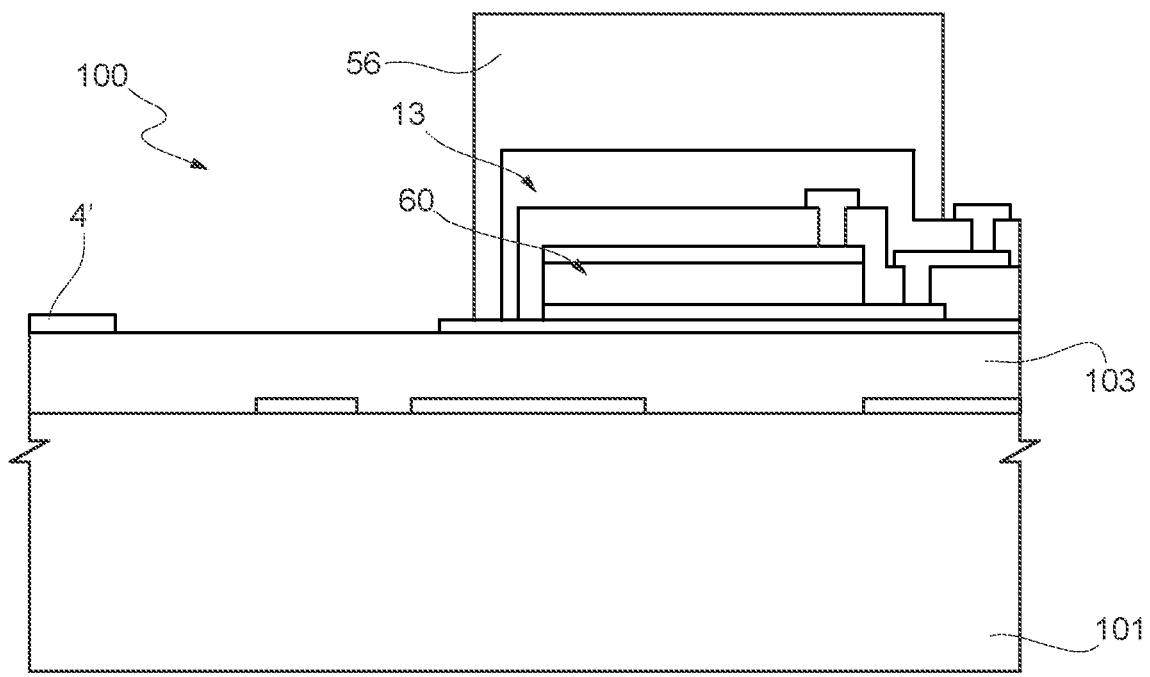

Then, as shown in FIG. 15, a polymeric layer is deposited and patterned, forming the soft region 56.

Figure 16:
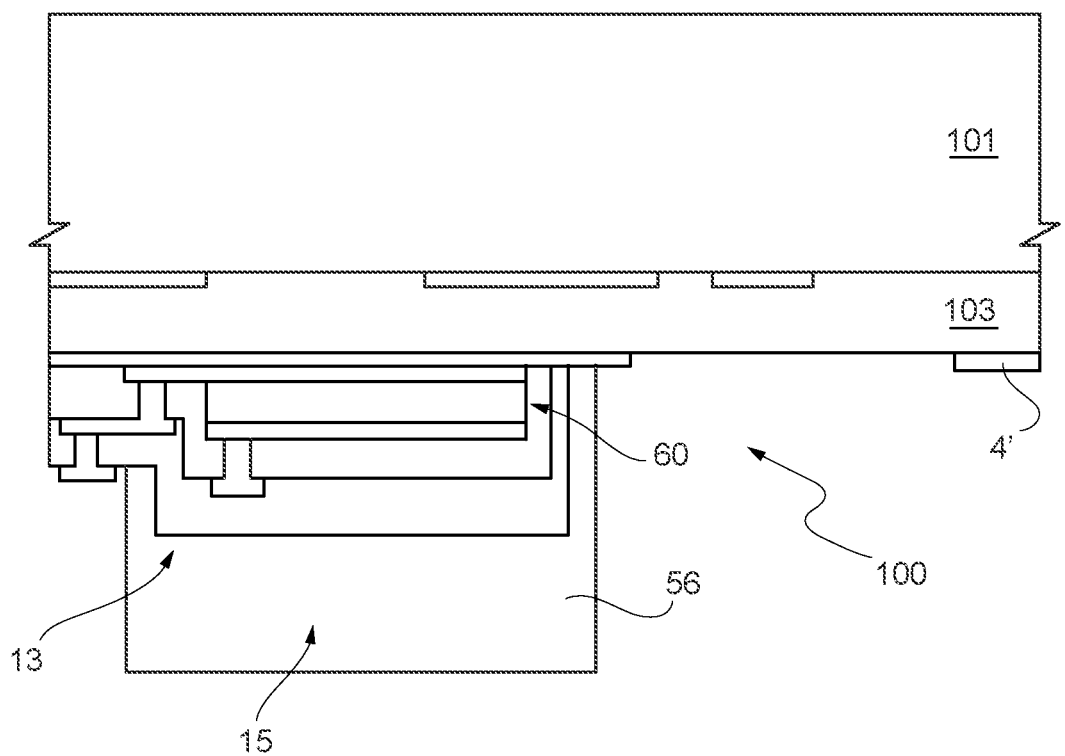

Subsequently, FIG. 16, the wafer 100 is flipped over and thinned, so as to reduce the thickness of the substrate 101 to the desired value for the first layer 40, for example variable between 100 and 250 µm. Thinning may be performed according to any suitable technique, for example by grinding and polishing.

Figure 17:
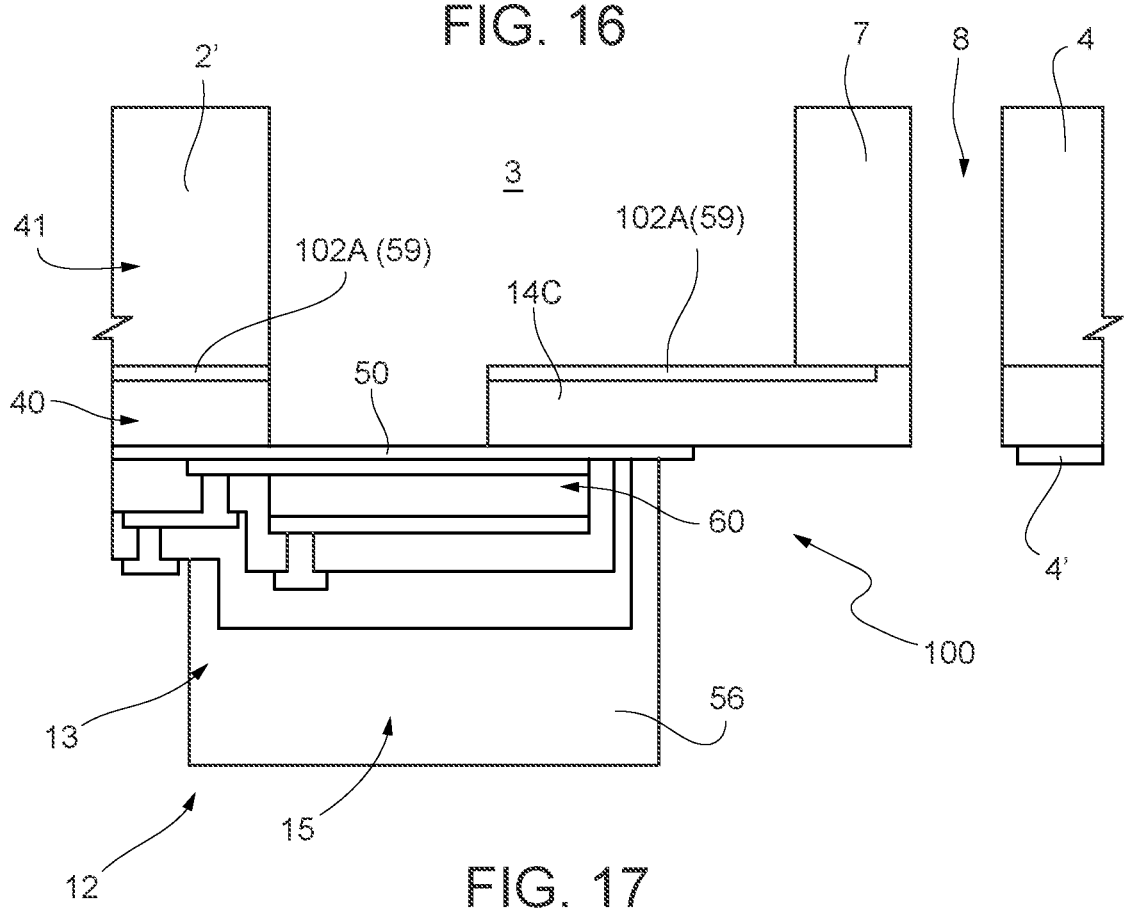

In FIG. 17, the wafer 100 is etched from the back in a masked manner, for example by a dry etching, such as DRIE—Deep Reactive Ion Etching, so as to remove both the substrate 101 and the bearing layer 103, where the barrier regions 102A are not present, stopping on the first dielectric region 50 at the slow actuation arms 12A-12D (being defined), and so as to remove only the substrate 100, where are the barrier regions 102A.

In this manner, the fixed structure 2', the internal frame 7, the tiltable structure 4 and the support elements 5A, 5B (the latter, not visible in FIG. 17), formed by both the semiconductor layers 101 and 103, are defined. Furthermore, the transmission elastic elements 14A-14D, the torsional elastic elements 16A, 16B and the bearing structures 15 of the fast actuation arms 17A, 17B (not visible in FIG. 17), formed by the sole second semiconductor layer 41, are defined. In this step, the slow actuation arms 12A-12D are also freed. Precisely, under the slow actuation arms 12A-12D, both the first and the second semiconductor layers 40, 41 are removed.

In this manner, the cavity 3 is also formed.

Then, FIG. 18, the barrier regions 102A are removed where exposed, by an oxide removal etching. In particular, the barrier regions 102A are removed below the slow actuation arms 12A-12D. The remaining portions of the barrier regions 102A thus form the oxide regions 59.

Furthermore, a cap wafer 120, previously processed to form the recess 26, is attached to the first wafer 100, forming a composite wafer 130.

To this end, the bonding region 25, for example of oxide, may be arranged between the fixed structure 4 and the portion of the cap wafer 120 surrounding the recess 26.

After dicing the composite wafer 130, the device 1 of FIGS. 1-7 is obtained.

FIG. 19 shows a device 200 wherein the soft region 56 is arranged at the bottom of the piezoelectric stack 60.

In this case, the manufacturing process differs from what has been shown in FIGS. 8-18 and described above in that the soft region 56 is deposited directly above the second semiconductor layer 41, after growing the latter (after the step of FIG. 9) and defined before forming the stack of layers 104-107 of FIG. 10.

The device 1, 200 may be modified so as to include an additional layer to modulate the stiffness of the slow actuation arms 12A-12D.

Figure 20:
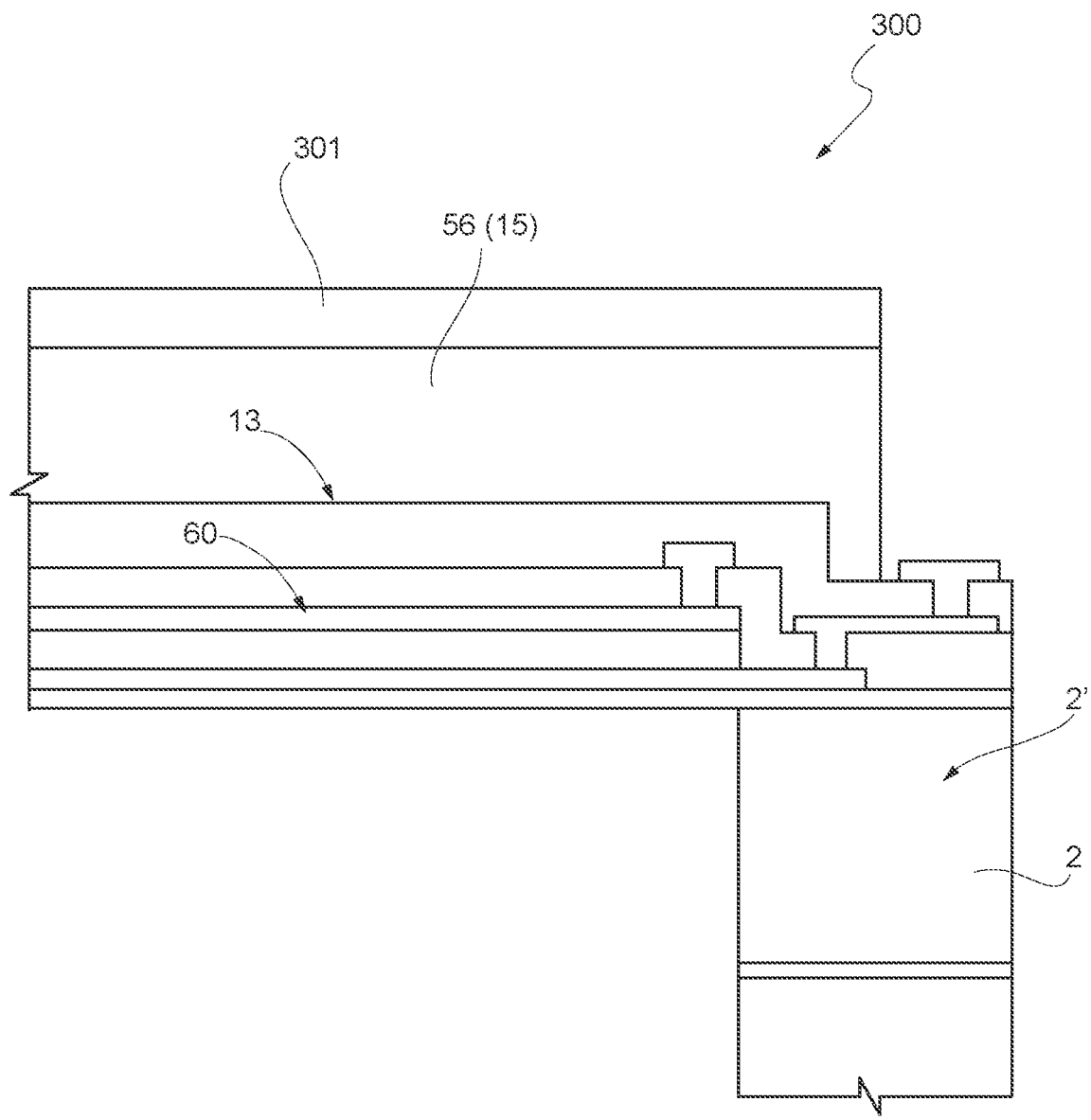
FIG. 20 is a cross-section, similar to FIG. 6, on an enlarged scale, of a different embodiment of the micro-electro-mechanical device disclosed herein.

For example, FIG. 20 shows a device 300 having an additional layer 301 above the soft region 56.

The additional layer 301 is typically a layer having a stiffness (Young's modulus) greater than the polymeric material of the soft region 56, for example 100 times greater, with a thickness comprised between 0.5 and 2 µm.

For example, the additional layer 301 is a material chosen from silicon oxide, silicon nitride, metal or the like and has a stiffness comparable to that of the polymeric material or intermediate between the polymeric material of the soft region 56 and the silicon of the transmission elastic elements 14A-14D.

In this manner, the total stiffness of the slow actuation arms 12A-12D may be chosen on the basis of the best trade-off between stiffness and robustness, also here independently of the stiffness and robustness of the respective transmission elastic elements 14A-14D.

As indicated above, the mirror device described here allows the elastic characteristics of the actuation arms to be optimized so as to improve the efficiency in driving the movement of the tiltable structure 4. In this manner, with the same dimensions, geometry and other design considerations, the device described herein affords a greater rotation angle of the tiltable structure 4 (and therefore of the reflecting structure 4'), with a gain, in some cases, of 35%.

Alternatively, for a same rotation angle, the slow actuation arms 12A-12D may be shorter, with a reduction of the total dimensions of the device 1 and in some cases allowing an area reduction in the die 1' of about 20%.

The robustness obtainable with the device described herein has been assessed and the results are below.

In particular, taking into account that the robustness $R_{shock}$ depends on the frequency of the first spurious mode $f_{spur}$: $R_{shock} \propto f_{spur}^2$.

It has been verified that the device described herein provides a robustness improvement of 5% with respect to equal devices, having slow actuation arms 12A-12D of silicon, even if optimized.

Finally, it is clear that modifications and variations may be made to the mirror device and the manufacturing process thereof, described and illustrated herein, without thereby departing from the scope of this disclosure, as defined in the attached claims. For example, the different embodiments described may be combined to provide further embodiments.

Furthermore, the sequence of manufacturing steps is merely indicative, and some steps may be carried out before or after others, differently from what has been described. For example, the reflecting surface 4' may be formed before or after forming the piezoelectric stack 60 and/or the soft region 56, or even after bonding the wafers 100, 120. Similarly, the piezoelectric stack 60 and the soft region 56 might be formed after bonding the wafers 100, 120.

Although the Figures refer to biaxial mirror devices, the principles herein may be applied to monoaxial micromirrors.

The additional layer 303 may be arranged above or below the soft region 54.

The invention claimed is:

1. A micro-electro-mechanical systems (MEMS) mirror device, comprising:
   a fixed structure defining an external frame delimiting a cavity;
   a tiltable structure extending into the cavity;
   a reflecting surface carried by the tiltable structure and having a main extension in a first plane; and
   an actuation structure coupled between the tiltable structure and the fixed structure;
   wherein the actuation structure comprises at least one first pair of actuation arms configured to cause rotation of the tiltable structure around a first rotation axis parallel to the first plane, the actuation arms of the at least one first pair of actuation arms being elastically coupled to the tiltable structure through respective elastic coupling elements with each actuation arm comprising a bearing structure and a piezoelectric structure, and
   wherein the bearing structure of each actuation arm of the at least one first pair of actuation arms comprises a first region made of a first material and the elastic coupling elements comprise a bearing layer made of a second material, the second material having greater stiffness than the first material.

2. The MEMS mirror device according to claim 1, wherein the second material comprises silicon.

3. The MEMS mirror device according to claim 1, wherein the first material comprises a polymeric material.

4. The MEMS mirror device according to claim 1, wherein the first material comprises a dry film photoresist.

5. The MEMS mirror device according to claim 1, wherein the bearing structure further comprises an additional layer made of a third material having a stiffness equal to a stiffness of the second material, the additional layer being arranged above or below the first region.

6. The MEMS mirror device according to claim 5, wherein the third material is chosen from the group consisting of silicon oxide, silicon nitride, metal.

7. The MEMS mirror device according to claim 1, wherein the bearing structure further comprises an additional layer made of a third material having a stiffness greater than the first material and lower than the second material, the additional layer being arranged above or below the first region.

8. The MEMS mirror device according to claim 7, wherein the piezoelectric structure overlays the cavity and the bearing structure overlays the piezoelectric structure.

9. The MEMS mirror device according to claim 1, wherein the bearing structure overlays the cavity and the piezoelectric structure overlays the bearing structure.

10. The MEMS mirror device according to claim 1, further comprising an internal frame surrounding the tiltable structure, the internal frame being rigidly coupled to the tiltable structure and elastically coupled to the at least one first pair of actuation arms through the elastic coupling elements.

11. The MEMS mirror device according to claim 10, wherein the actuation structure further comprises a pair of actuation arms configured to cause rotation of the tiltable structure around a second rotation axis, transverse to the first rotation axis and parallel to the first plane, the actuation arms of the pair of actuation arms being elastically coupled to the internal frame through respective actuation elastic elements and comprising respective bearing structures and respective piezoelectric structures; wherein the tiltable structure, the fixed structure, the bearing structures of the actuation arms and the actuation elastic elements are made of the second material.

12. The MEMS mirror device according to claim 11, wherein the actuation arms of the at least one first pair of actuation arms are elastically coupled to the internal frame on opposite sides of the first rotation axis; further comprising a second pair of actuation arms arranged symmetrically to the at least one first pair of actuation arms with respect to the second rotation axis, the actuation arms of the second pair of actuation arms being elastically coupled to the tiltable structure on opposite sides of the first rotation axis, through respective elastic elements.

13. The MEMS mirror device according to claim 9, wherein the tiltable structure is configured to rotate around the first rotation axis with a quasi-static movement and to rotate around the second rotation axis with a resonant movement.

14. A process of manufacturing a micro-electro-mechanical systems (MEMS) mirror device, comprising:
   forming a fixed structure defining an external frame which delimits a cavity;
   forming a tiltable structure extending into the cavity;
   forming a reflecting surface carried by the tiltable structure and having a main extension in a first plane; and
   forming an actuation structure, coupled between the tiltable structure and the fixed structure and configured to cause rotation of the tiltable structure around a first rotation axis parallel to the first plane,
   wherein forming the actuation structure comprises forming at least one first pair of actuation arms and forming elastic coupling elements each elastically coupling a respective first actuation arm of the at least one first pair of actuation arms to the tiltable structure,
   wherein forming the at least one first pair of actuation arms comprises forming a bearing structure and forming a piezoelectric structure, and
   wherein the bearing structure of each actuation arm of the at least one first pair of actuation arms comprises a first region made of a first material and the elastic coupling elements comprise a bearing layer made of a second material, the second material having greater stiffness than the first material.

15. The process according to claim 14, further comprising:
   on a wafer made of semiconductor material having a first and a second face, forming a piezoelectric region and a first region on the first face;
   partially removing the semiconductor material of the wafer from the second face to form the cavity and define the fixed structure, the tiltable structure, and the elastic coupling elements of the at least one first pair of actuation arms, and
   completely removing the semiconductor material of the wafer below the at least one first pair of actuation arms.

16. The process according to claim 14, wherein forming a piezoelectric structure comprises forming and patterning a first electrode layer, a piezoelectric layer, and a second piezoelectric layer, and wherein forming a bearing structure comprises forming a first region made of a polymeric material above or below the piezoelectric structure.

17. A MEMS mirror device, comprising:
   a frame encompassing a cavity;
   a mirror element extending into the cavity, rotatable, carrying a reflecting surface in a first plane; and
   an actuation component linking the mirror element and the frame;
   the actuation component including at least one pair of actuation arms promoting rotation of the mirror element around an axis parallel to the first plane, the pair of actuation arms being elastically linked to the mirror element via elastic coupling elements, each actuation arm having a bearing structure and a piezoelectric structure, the bearing structure of each actuation arm comprised of a first region made of a first material, and the elastic coupling elements including a bearing layer made of a second material, the second material being stiffer than the first material.

18. The MEMS mirror device of claim 17, further comprising an internal frame around the mirror element, rigidly linked to the mirror element and elastically linked to the actuation arms via the elastic coupling elements.

19. The MEMS mirror device of claim 18, where the actuation component includes another pair of actuation arms promoting rotation of the mirror element around a second rotation axis, parallel to the first plane and perpendicular to the first rotation axis, the arms being elastically linked to the internal frame via actuation elastic elements, each actuation arm having a bearing structure and a piezoelectric structure; the mirror element, frame, bearing structures of the arms, and actuation elastic elements being made of the second material.

20. The MEMS mirror device of claim 19, where the actuation arms of the first pair are elastically linked to the internal frame on opposite sides of the first rotation axis; further comprising a second pair of actuation arms symmetric to the first pair of actuation arms with respect to the second rotation axis, the actuation arms of the second pair are elastically linked to the mirror element on opposite sides of the first rotation axis, through elastic elements.

* * * * *